(12) United States Patent
Weathers et al.

(10) Patent No.: US 11,286,067 B2
(45) Date of Patent: Mar. 29, 2022

(54) SELECTIVELY ADJUSTABLE INTERFACE ASSEMBLY

(71) Applicant: THE BOEING COMPANY, Chicago, IL (US)

(72) Inventors: Jeffrey W. Weathers, Huntsville, AL (US); Dustin Gregory Padgett, Huntsville, AL (US)

(73) Assignee: THE BOEING COMPANY, Chicago, IL (US)

(*) Notice: Subject to any disclaimer, the term of this patent is extended or adjusted under 35 U.S.C. 154(b) by 733 days.

(21) Appl. No.: 16/154,832

(22) Filed: Oct. 9, 2018

(65) Prior Publication Data

US 2020/0108955 A1 Apr. 9, 2020

(51) Int. Cl.
*B64G 1/64* (2006.01)

(52) U.S. Cl.
CPC .................................. *B64G 1/641* (2013.01)

(58) Field of Classification Search
CPC ..... B64G 1/641; B64G 1/40; F16B 2200/503; F02K 9/84
See application file for complete search history.

(56) References Cited

U.S. PATENT DOCUMENTS

| 5,397,244 | A | * | 3/1995 | Generoli | H01R 13/635 439/248 |
| 6,135,391 | A | * | 10/2000 | Van Woerkom | B64G 1/641 102/377 |
| 7,104,740 | B2 | * | 9/2006 | Girardin | A61G 3/0808 410/7 |
| 9,487,190 | B1 | * | 11/2016 | Alvarado | B60T 1/14 |
| 2005/0214089 | A1 | * | 9/2005 | Girardin | A61G 3/0808 410/7 |
| 2013/0327895 | A1 | * | 12/2013 | Aston | B64G 1/645 244/173.3 |

* cited by examiner

*Primary Examiner* — Philip J Bonzell
(74) *Attorney, Agent, or Firm* — The Small Patent Law Group LLC; Joseph M. Butscher

(57) ABSTRACT

A system includes a first component, a second component, a locking pin, and an interface assembly that is configured to selectively adjust a stiffness of a coupling interface between the first component and the second component. The interface assembly includes at least one support coupler secured to the first component. The support coupler(s) includes a main body, a first arm extending from a first side of the main body, a second arm extending from a second side of the main body, and a flange extending from the main body. The flange includes a locking pin hole that is configured to selectively receive the locking pin. The locking pin is selectively moveable between a retracted position in which the locking pin is out of the locking pin hole, and a deployed position in which the locking pin extends into the locking pin hole and a portion of the first component and locks the interface assembly to the first component.

23 Claims, 4 Drawing Sheets

SELECTIVELY ADJUSTABLE INTERFACE ASSEMBLY

STATEMENT REGARDING FEDERALLY SPONSORED RESEARCH OR DEVELOPMENT

The invention described herein was made in the performance of work under NASA Contract No. NNM07AB03C and is subject to the provisions of Section 305 of the National Aeronautics and Space Act of 1958 (72 Stat. 435: 42 U.S.C. 2457).

FIELD OF THE DISCLOSURE

Embodiments of the present disclosure generally relate to an interface assembly that is configured to selectively adjust interface stiffness with respect to one or more components.

BACKGROUND OF THE DISCLOSURE

Various vehicles have numerous components that are connected together. For example, a vehicle may include a frame and a variety of different components secured to the frame.

Aeronautical and space vehicles include avionics and propulsion systems connected to other components, such as frames. As an example, a known space vehicle includes an upper stage that includes an electromechanical actuation system that couples rocket engines to a frame. During a first stage of flight, interface loads between the electromechanical actuation system and thrust beams may be at a maximum magnitude. A stiffness of the interface contributes to a dynamic behavior of the vehicle. In short, the interface loads increase with increased stiffness between the components.

SUMMARY OF THE DISCLOSURE

A need exists for an assembly, system, and method of selectively adjusting stiffness of a coupling interface so as to selectively reduce or increase interface stiffness between components, such as within a vehicle. Further, a need exists for selectively adjusting interface stiffness between components, such as within a vehicle, during different stages of operation.

With those needs in mind, certain embodiments of the present disclosure provide a system including a first component, a second component, a locking pin, and an interface assembly that is configured to selectively adjust a stiffness of a coupling interface between the first component and the second component. The interface assembly includes at least one support coupler secured to the first component. The support coupler(s) includes a main body, a first arm extending from a first side of the main body, a second arm extending from a second side of the main body, and a flange extending from the main body. The flange includes a locking pin hole that is configured to selectively receive the locking pin. The locking pin is selectively moveable between a retracted position in which the locking pin is out of the locking pin hole, and a deployed position in which the locking pin extends into the locking pin hole and a portion of the first component and locks the interface assembly to the first component.

In at least one embodiment, the system is a launch platform system, the first component is a frame, and the second component is a thrust beam. The support coupler(s) may be secured to a portion of the second component. The second component may be a thrust beam and the portion may be a lug. In at least one embodiment, the first component is a panel, and the lug of the thrust beam extends through a lug-passage channel formed through a ledge of the panel.

In at least one embodiment, the coupling interface has a first stiffness when the locking pin is in the retracted position, and a second stiffness when the locking pin is in the deployed position. The second stiffness exceeds the first stiffness.

An actuator may operatively couple to the locking pin. The actuator is configured to selectively move the locking pin between the retracted position and the deployed position.

In at least one embodiment, a first support coupler is on a first surface of the first component, and a second support coupler is on a second surface of the first component. The first surface is opposite from the second surface.

In at least one embodiment, the main body includes a coupling aperture that retains a central coupling pin that securely couples the support coupler(s) to the first component. The first arm includes a first through-hole at a first distal end, and the second arm includes a second through-hole at a second distal end. The first through-hole retains a first end fastener that couples the support coupler(s) to the first component, and the second through-hole retains a second end fastener that couples the support coupler(s) to the first component.

The coupling aperture, the first through-hole, and the second through-hole may be aligned along a longitudinal axis. The locking pin hole and the coupling aperture may be aligned along a lateral axis that is orthogonal to the longitudinal axis.

The locking pin hole of the flange may be aligned with a pin-receiving channel formed through the first component. The locking pin extends into the locking pin hole and the pin-receiving channel when the locking pin is in the deployed position.

Certain embodiments of the present disclosure provide a method for selectively adjusting a stiffness of a coupling interface between a first component and a second component. The method includes securing at least one support coupler to the first component. The support coupler(s) includes a main body, a first arm extending from a first side of the main body, a second arm extending from a second side of the main body, and a flange extending from the main body. The flange includes a locking pin hole that is configured to selectively receive the locking pin. The method also includes selectively moving the locking pin between a retracted position in which the locking pin is out of the locking pin hole, and a deployed position in which the locking pin extends into the locking pin hole and a portion of the first component and locks the interface assembly to the first component. The method may also include securing the support coupler(s) to a portion of the second component.

The method may also include operatively coupling an actuator to the locking pin. The selectively moving may include operating the actuator to selectively move the locking pin between the retracted position and the deployed position.

The securing may include retaining a central coupling pin within a coupling aperture of the main body, retaining a first end fastener within a first through-hole at a first distal end of the first arm, and retaining a second end fastener within a second through-hole at a second distal end of the second arm.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide an interface assembly for selectively adjusting an interface stiffness between components of a system. In at least one embodiment, the system includes a frame, a beam having a lug with a coupling hole therein. The system further includes a support coupler having first and second distal ends secured via fasteners to the frame, and a main body with a coupling aperture coupled via a securing pin to the coupling hole in the beam lug. The support coupler includes a flange extending upward from the main body and having a locking pin hole in which a locking pin is selectively inserted to secure the flange to the frame. When the locking pin is removed from the locking pin hole the support coupler has a nominal stiffness that mitigates interface loads between the beam and frame. When the locking pin is inserted in the locking pin hole to secure the flange of to the frame the support coupler selectively provides an increased stiffness higher than the nominal stiffness. In at least one embodiment, the span of the support coupler between the opposing ends has a length that is tuned based on dynamic behavior such that the interface loads are minimized or otherwise reduced. The system may also include an actuator, which when actuated, moves the locking pin to a deployed position within the transverse hole in the flange of the support coupler.

The interface assembly may be used with a launch platform system of a space vehicle to provide compliance during a first flight stage when interface loads are at peak levels and thrust vectoring is generally not required. During a second flight stage, when thrust vectoring occurs, the interface loads are reduced, and a mechanical locking feature is actuated to provide increased stiffness.

Figure 1:
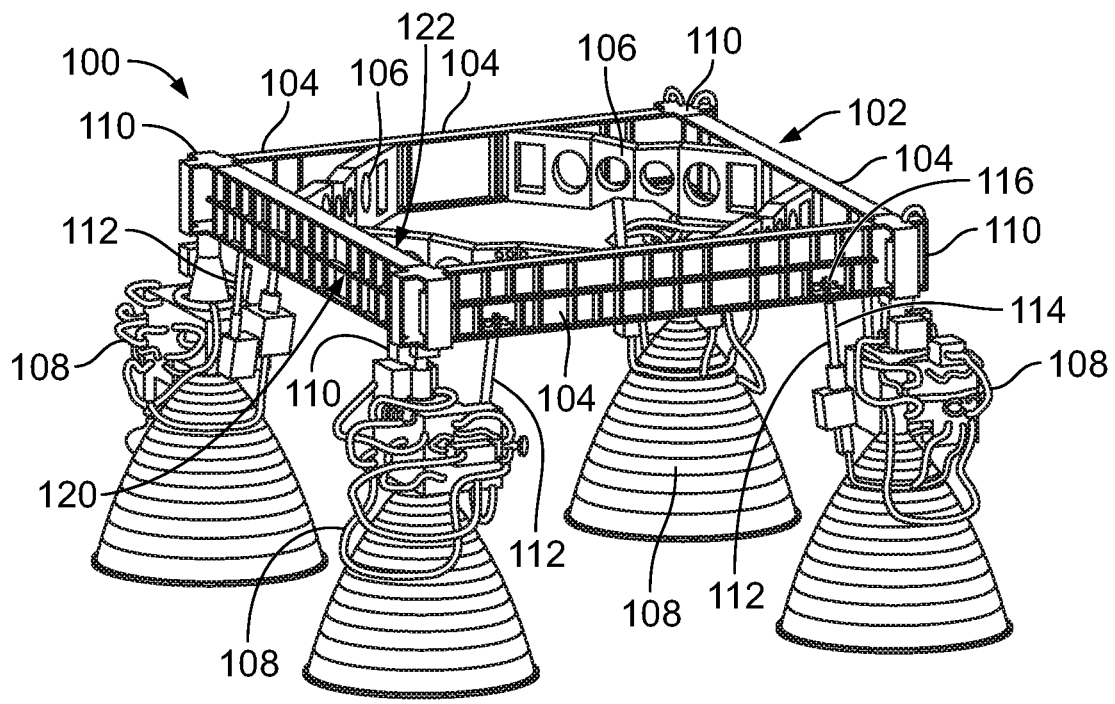
FIG. 1 illustrates a perspective view of a launch platform system, according to an embodiment of the present disclosure.

FIG. 1 illustrates a perspective view of a launch platform system 100, according to an embodiment of the present disclosure. The launch platform system 100 includes a frame 102, which may include panels 104 and interior braces 106 between adjacent panels 104. As shown, the frame 102 may include orthogonal panels 104 connected together at right angles. Optionally, the frame 102 may have various other shapes and sizes. For example, the panels 104 may be curved or arcuate. In at least one embodiment, the panels 104 may provide a circular or annular structure.

One or more engines 108 are coupled to the frame 102. For example, four engines 108 may be coupled to corners 110 of the frame 102. Optionally, the launch platform system 100 may include more or less engines 108 than shown.

Additionally, actuators 112 may be operatively coupled to the frame 102 and the engines 108. As shown, each engine 108 may be coupled to two actuators 112, which couple to the frame 102. Optionally, more or less actuators 112 may be used. The actuators 112 may be electromechanical actuators, for example.

Each actuator 112 may include a thrust beam 114 that couples to a panel 104 via an interface assembly 116. As described herein, the interface assembly 116 is configured to selectively adjust an interface stiffness between the thrust beam 114 and the panel 104.

Optionally, the interface assembly 116 may be used with various other systems, other than launch platform systems. As described herein, the interface assembly 116 is configured to selectively adjust a stiffness of a coupling interface between the interface assembly 116, a first component, such as the frame 102, and a second component, such as the thrust beam 114.

Figure 2:
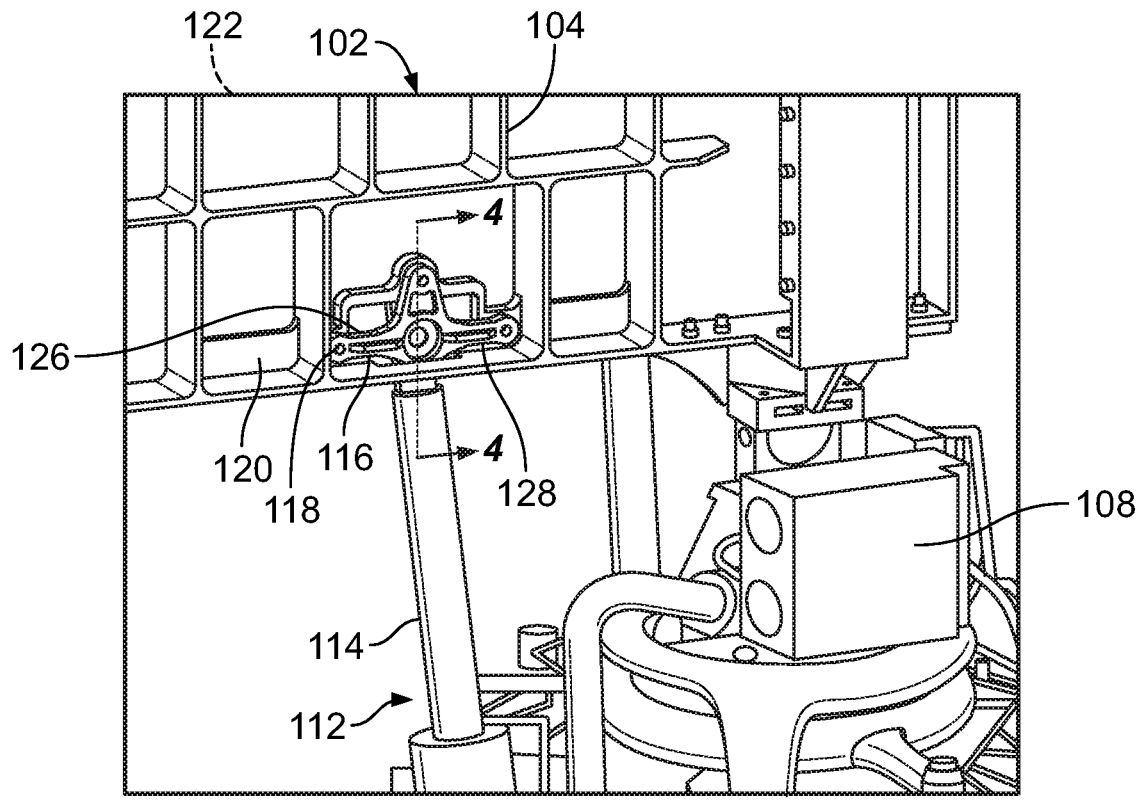
FIG. 2 illustrates a perspective front view of an interface assembly coupling a thrust beam to a panel of a frame, according to an embodiment of the present disclosure.

FIG. 2 illustrates a perspective front view of the interface assembly 116 coupling a thrust beam 114 to a panel 104 of the frame 102, according to an embodiment of the present disclosure. The interface assembly 116 includes one or more support couplers 118 coupled to the panel 104. For example, the interface assembly 116 may include a first support coupler 118 coupled to an outer surface 120 of the panel 104, and an axially aligned second support coupler 118 coupled to an inner surface 122 of the panel 104. In at least one embodiment, the interface assembly 116 may include a single support coupler 118, such as coupled to the outer surface 120 or the inner surface 122 of the panel 104.

Figure 3:
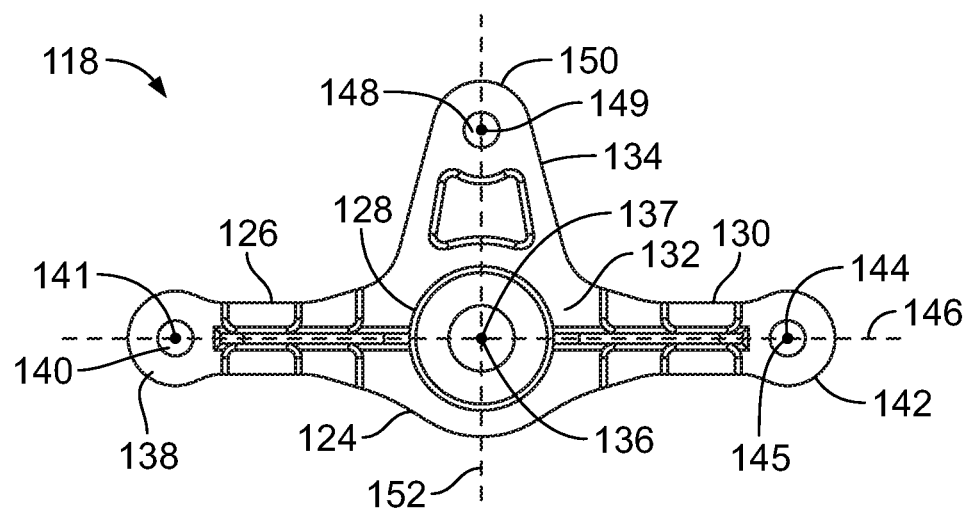
FIG. 3 illustrates a front view of a support coupler, according to an embodiment of the present disclosure.

FIG. 3 illustrates a front view of a support coupler 118, according to an embodiment of the present disclosure. The support coupler 118 includes a central main body 124, a first arm 126 extending from a first side 128 of the main body 124, a second arm 130 (opposite from the first arm 126) extending from a second side 132 of the main body 124, and a flange 134 extending upwardly from the main body 124.

A coupling aperture 136 is formed through the main body 124. The coupling aperture 136 may be formed through a central portion of the main body 124.

The first arm 126 includes a first distal end 138. A first through-hole 140 is formed through the first distal end 138. The second arm 130 includes a second distal end 142, which is opposite from the first distal end 138. A second through-hole 144 is formed through the second distal end 142. As shown, the coupling aperture 136, the first through-hole 140, and the second through-hole 144 may be aligned along a longitudinal axis 146. In particular, a center 137 of the coupling aperture 136, a center 141 of the first through-hole 140, and a center 145 of the second through-hole 144 may be aligned along the longitudinal axis 146.

The flange 134 includes a locking pin hole 148 formed through a distal end 150. The locking pin hole 148 and the coupling aperture 136 are aligned along a lateral axis 152, which is orthogonal to the longitudinal axis 146. A center 149 of the locking pin hole 148 and the center 137 of the coupling aperture 136 may be aligned along the lateral axis 152.

As shown, the first arm 126 and the second arm 130 may have the same or approximately the same length. The lengths of the first arm 126 and the second arm 130 may exceed the length of the flange 134. Optionally, the flange 134 may be longer than either of the first arm 126 or the second arm 130. In at least one other embodiment, the first arm 126 and the second arm 130 may have different lengths.

The relative lengths, relative thicknesses, relative shapes, and relative sizes of the main body 124, the first arm 126, the second arm 130, and the flange 134 may be different than shown, depending on a desired amount of stiffness to be applied to coupling joint. For example, the sizes and shapes of the main body 124, the first arm 126, the second arm 130, and the flange 134 may be adapted and tuned to a desired stiffness. That is, the sizes and shapes (including lengths, thicknesses, and the like) of the portions of the support coupler 118 may be tuned based on dynamic behavior to adaptively control interface loads between the support coupler 118 (and the interface assembly 116) and components coupled thereto, such as the thrust beam 114 and the panel 104 (shown in FIGS. 1 and 2, for example).

Figure 4:
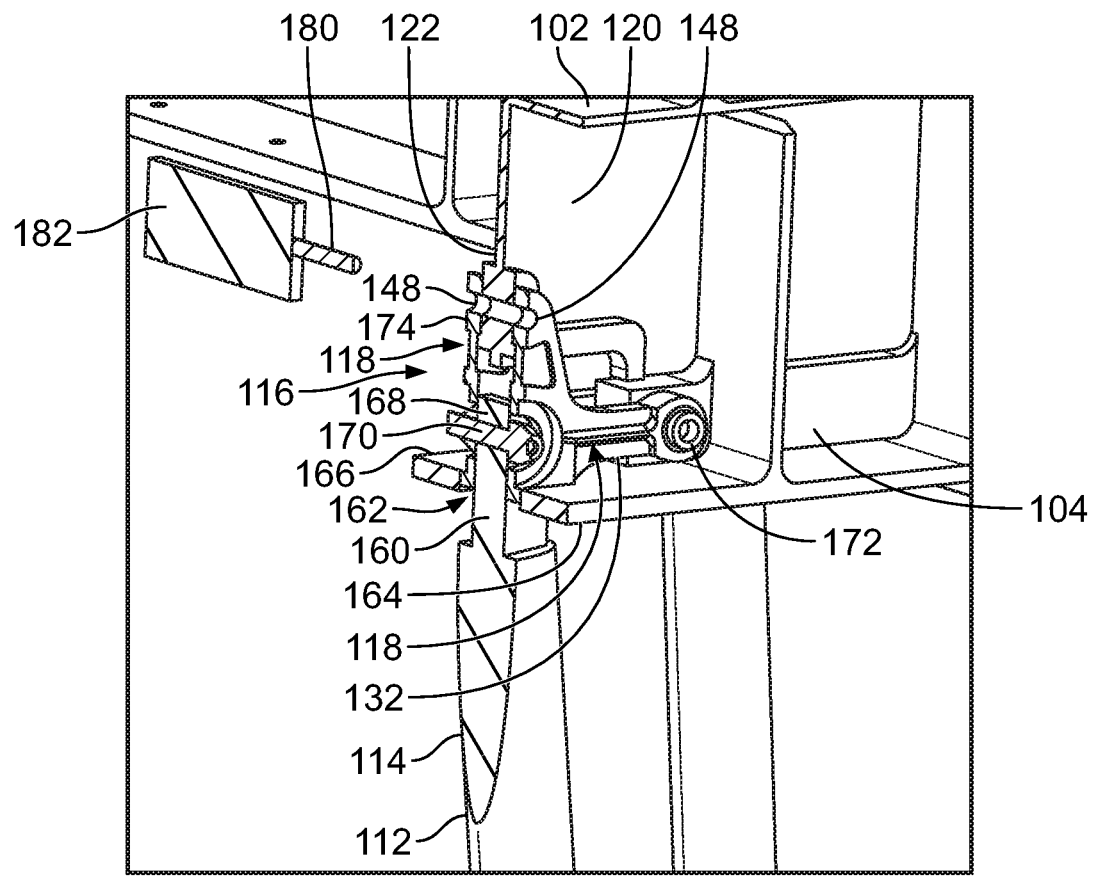
FIG. 4 illustrates a perspective cross-sectional view of the interface assembly coupling the thrust beam to the panel of the frame through line 4-4 of FIG. 2.
Figure 5:
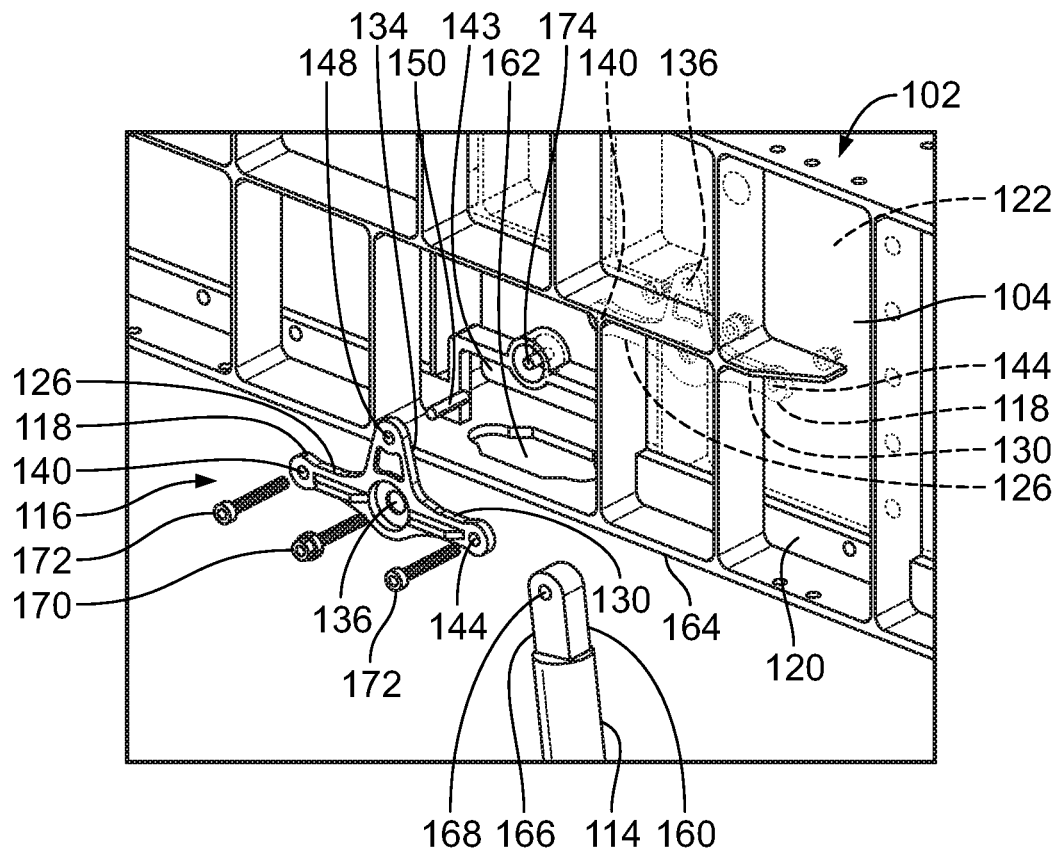
FIG. 5 illustrates a perspective exploded view of the interface assembly that couples the thrust beam to the panel of the frame.

FIG. 4 illustrates a perspective cross-sectional view of the interface assembly 116 coupling the thrust beam 114 to the panel 104 of the frame 102 through line 4-4 of FIG. 2. FIG. 5 illustrates a perspective exploded view of the interface assembly 116 that couples the thrust beam 114 to the panel 104 of the frame 102. For the sake of clarity, the panel 104 is shown transparent in FIG. 5. Referring to FIGS. 2-5, the thrust beam 114 includes a beam end 160 that extends through a lug-passage channel 162 formed through a ledge 164 of the panel 104. The beam end 160 includes a lug 166 having a coupling hole 168 formed therethrough.

The interface assembly 116 includes a first support coupler 118 coupled to the outer surface 120 of the panel 104 and a second support coupler 118 coupled to the inner surface 122 of the panel 104. The coupling apertures 136, the first through-holes 140, the second through-holes 144, and the locking pin holes 148 of the opposed first support coupler 118 and the second support coupler 118 are axially aligned with one another, respectively. Optionally, the interface assembly 116 may include just one of the first support coupler 118 or the second support coupler 118.

A central securing pin 170 (or similar fastener) extends through the aligned coupling apertures 136 of the first support coupler 118 and the second support coupler 118, as well as the coupling hole 168 of the lug 166 of the thrust beam 114. Similarly, end fasteners 172 (only one end fastener 172 is shown in FIG. 4) extend through first through-holes 140, the second through-holes 144, and a passage 143 (or one or more holes) formed through the panel 104. In this manner, the interface assembly 116 couples the thrust beam 114 to the panel 104 via the support couplers 118, the central securing pin 170, and the end fasteners 172.

The locking pin holes 148 of the flanges 134 of the first support coupler 118 and the second support coupler 118 are aligned with a pin-receiving channel 174 formed through the panel 104. When the locking pin holes 148 are longitudinally aligned with the pin-receiving channel 174, a locking pin 180 may be urged therethrough to lock the interface assembly 116 in a locked position, thereby restricting motion of the thrust beam 114. In this manner, the locking pin 180 may be used to lock the interface assembly 116 into position to provide a coupling between the thrust beam 114, the panel 104, and the interface assembly 116 having increased stiffness. When the locking pin 180 is not within the locking pin holes 148 and the pin-receiving channel 174, the coupling between the thrust beam 114, the panel 104, and the interface assembly 116 is of decreased stiffness. That is, the locking pin 180 may be selectively inserted and removed from the flanges 134 and the panel 104 to selectively adapt a desired stiffness of the coupling between the interface assembly 116, the thrust beam 114, and the panel 104 of the frame 102. To increase the stiffness of the coupling, the locking pin 180 is inserted into the flanges 134 and the panel 104. To decrease the stiffness of the coupling, the locking pin 180 is removed from the flanges 134 and the panel 104.

The locking pin hole 148 of the flange 134 is selectively locked to the frame 102 (such as the panel 104) by the locking pin 180 in the deployed position. The deployed position is the locking pin 180 extending through the aligned locking pin hole 148 of the flange 134 and the pin-receiving channel 174 of the panel 104.

The interface assembly 116 has a nominal stiffness (which is less than the increased stiffness when the locking pin is in the deployed position) that mitigates interface loads between the thrust beam 114 and the frame 102 when the locking pin 180 is in a retracted position. The retracted position is the locking pin 180 not in the deployed position. That is, the retracted position is the locking pin 180 not extending through (or positioned out of) the aligned locking pin hole 148 and the pin-receiving channel 174 of the panel 104.

The locking pin 180 may be operatively coupled to a pin actuator 182, such as an electromechanical actuator, a pneumatic actuator, pyro-mechanical actuator (for example, a pyro pin), a high output paraffin actuator, or the like. The pin actuator 182 is configured to selectively move the locking pin 180 between the deployed position and the retracted position. As shown in FIG. 4, the locking pin 180 is in the retracted position.

Figure 6:
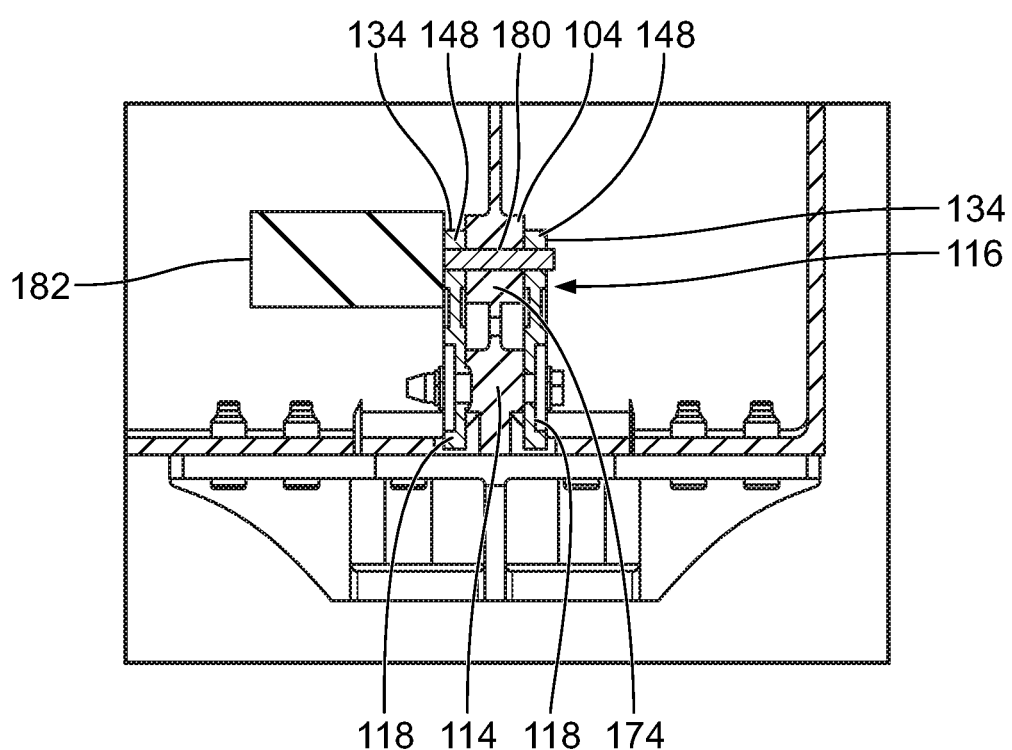
FIG. 6 illustrates a cross-sectional view of a locking pin in a deployed position through the interface assembly and the panel, according to an embodiment of the present disclosure.

FIG. 6 illustrates a cross-sectional view of the locking pin 180 in the deployed position through the interface assembly 116 and the panel 104, according to an embodiment of the present disclosure. As shown, the locking pin 180 extends through the aligned locking pin hole 148 of the flange 134 and the pin-receiving channel 174 of the panel 104.

Referring to FIGS. 1-6, when the locking pin 180 is in the retracted position, the stiffness of the coupling between the interface assembly 116, the thrust beam 114, and the panel 104 is reduced and relatively flexible. A load is transferred along the arms 126 and 130 of the support beam(s) 118 into the panel 104, thereby spreading the load over an increased area and providing increased flexibility and reduced stiffness. In contrast, when the locking pin 180 is in the deployed position, the load is short-circuited and transferred into the locking pin 180, thereby decreasing flexibility and increasing stiffness.

When the locking pin 180 is in the deployed position, the interface assembly 116 provides a first stiffness. When the locking pin 180 is in the retracted position, the interface assembly 116 provides a second stiffness that is less than the first stiffness. The locking pin 180 in the deployed position locks the interface assembly 116 to the panel 104, thereby creating a step change in stiffness as compared to when the locking pin 180 is in the retracted position.

The interface assembly 116 may be used with the launch platform system 100 to provide compliance during a first flight stage when interface loads are at peak levels and thrust vectoring is generally not required. For example, during the first flight stage, the pin(s) 180 are in the retracted positions, thereby providing increased flexibility and a reduced stiffness. During a second flight stage, when thrust vectoring occurs the interface loads are reduced, and the locking pin 180 is actuated into the deployed position to provide increased stiffness. Embodiments of the present disclosure may be used in various other applications other than a space vehicle. The launch platform system 100 is merely one example in which the interface assembly 116 is particularly well-suited to selectively adjust an interface stiffness between different components.

Figure 7:
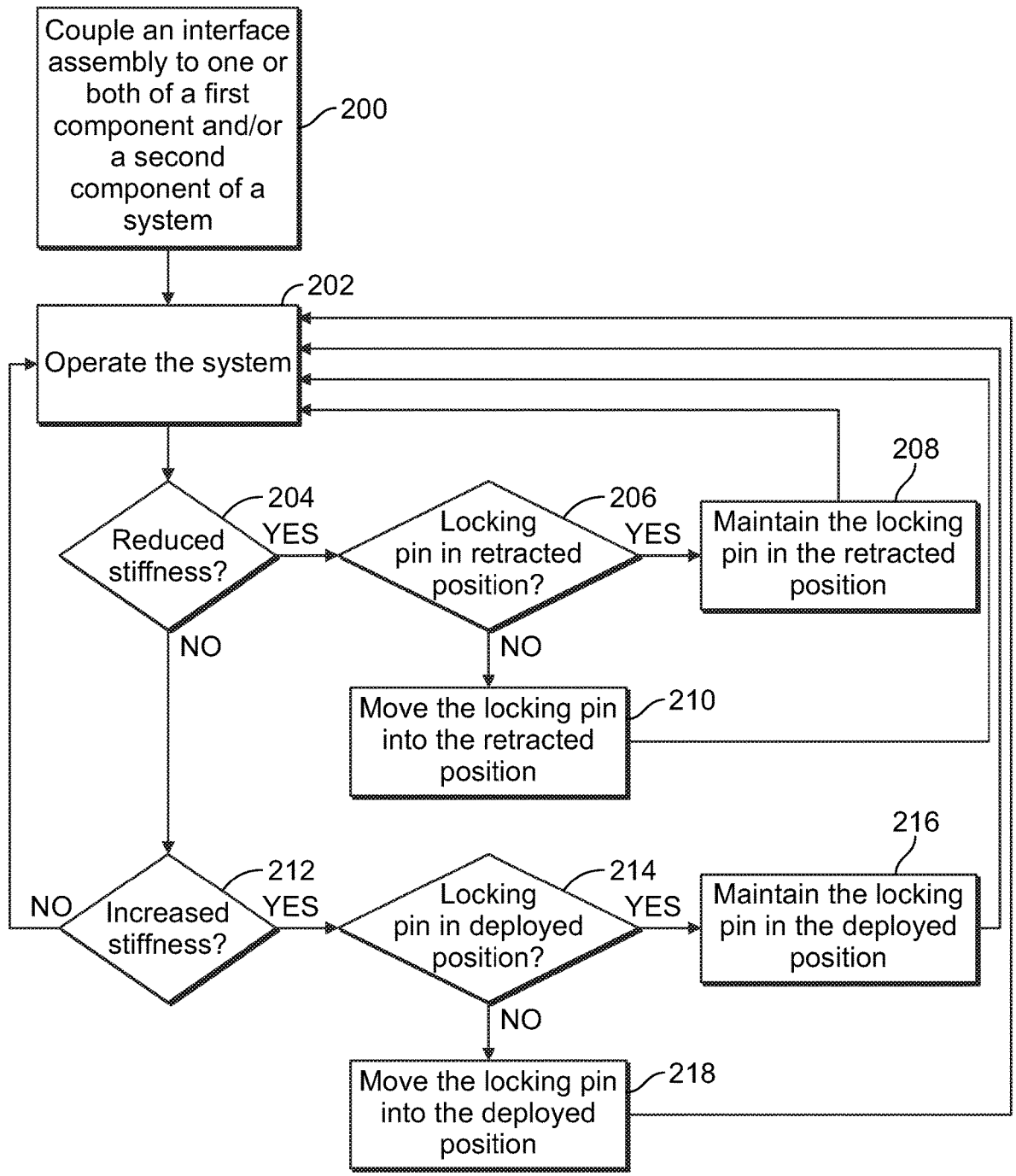
FIG. 7 illustrates a flow chart of a method of selectively adjusting a stiffness of a coupling between an interface assembly and one or more components coupled to the interface assembly, according to an embodiment of the present disclosure.

FIG. 7 illustrates a flow chart of a method of selectively adjusting a stiffness of a coupling between an interface assembly and one or more components coupled to the interface assembly, according to an embodiment of the present disclosure. Referring to FIGS. 1-7, the interface assembly 116 is coupled to one or both of a first component and/or a second component. The first component may be the panel 104, and the second component may be the thrust beam 114. A coupling interface is defined between the interface assembly 116 and the first component and/or the second component. A system, such as the launch platform system 100, includes the interface assembly 116, the first component, and/or the second component.

At 202, the system is operated. At 204, it is determined whether the coupling interface is to have a reduced stiffness (or a first stiffness). If so, the method proceeds to 206, at which it is determined whether the locking pin 180 is in a retracted position. If so, at 208, the locking pin 180 is maintained in the retracted position, and the method returns to 202.

If, however, the locking pin 180 is not in the retracted position at 206, the method proceeds from 206 to 210, at which the locking pin 180 is moved into the retracted position. The method then returns to 202.

If at 204 a reduced stiffness is not desired, the method proceeds to 212, at which it is determined whether an increased stiffness of the coupling interface is desired. If an increased stiffness is not desired at 212, the method returns to 202.

If, however, an increased stiffness (or a second stiffness that exceeds the first stiffness) of the coupling interface is desired, the method proceeds from 212 to 214, at which it is determined if the locking pin 180 is in the deployed position. If the locking pin 180 is in the deployed position, the method proceeds to 216, at which the locking pin 180 is maintained in the deployed position. The method then returns to 202.

If, however, the locking pin 180 is not in the deployed position at 214, the method proceeds to 218, at which the locking pin 180 is moved into the deployed position, thereby locking the interface assembly 116 to the first component and/or the second component. The method then returns to 202.

As described herein, embodiments of the present disclosure provide assemblies, systems, and methods that are configured to selectively adjust a stiffness of a coupling interface between one or more components. Embodiments of the present disclosure are particularly well suited for use with vehicles, such as aerospace vehicles, to selectively adjust a coupling interface during different stages of operation.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A launch platform system comprising:
   a first component;
   a second component;
   a locking pin; and
   an interface assembly that is configured to selectively adjust a stiffness of a coupling interface between the first component and the second component, the interface assembly comprising:
   at least one support coupler secured to the first component, wherein the at least one support coupler comprises a main body, a first arm extending from a first side of the main body, a second arm extending from a second side of the main body, and a flange extending from the main body, wherein the flange includes a locking pin hole that is configured to selectively receive the locking pin, wherein the locking pin is selectively moveable between a retracted position in which the locking pin is out of the locking pin hole, and a deployed position in which the locking pin extends into the locking pin hole and a first portion of the first component and locks the interface assembly to the first component.

2. The launch platform system of claim 1, wherein the system is a launch platform system, the first component is a frame, and the second component is a thrust beam.

3. The launch platform system of claim 1, wherein the at least one support coupler is secured to a second portion of the second component.

4. The launch platform system of claim 3, wherein the second component is a thrust beam and the second portion includes a lug.

5. The launch platform system of claim 4, wherein the first component is a panel, and wherein the lug of the thrust beam extends through a lug-passage channel formed through a ledge of the panel.

6. The launch platform system of claim 1, wherein the coupling interface has a first stiffness when the locking pin is in the retracted position, and a second stiffness when the locking pin is in the deployed position, and wherein the second stiffness exceeds the first stiffness.

7. The launch platform system of claim 1, further comprising an actuator operatively coupled to the locking pin, wherein the actuator is configured to selectively move the locking pin between the retracted position and the deployed position.

8. The launch platform system of claim 1, wherein the at least one support coupler comprises a first support coupler on a first surface of the first component, and a second support coupler on a second surface of the first component, wherein the first surface is opposite from the second surface.

9. The launch platform system of claim 1, wherein the main body comprises a coupling aperture that retains a central coupling pin that securely couples the at least one support coupler to the first component.

10. The launch platform system of claim 9, wherein the first arm comprises a first through-hole at a first distal end, and the second arm comprises a second through-hole at a second distal end, wherein the first through-hole retains a first end fastener that couples the at least one support coupler to the first component, and wherein the second through-hole retains a second end fastener that couples the at least one support coupler to the first component.

11. The launch platform system of claim 10, wherein the coupling aperture, the first through-hole, and the second through-hole are aligned along a longitudinal axis.

12. The launch platform system of claim 11, wherein the locking pin hole and the coupling aperture are aligned along a lateral axis that is orthogonal to the longitudinal axis.

13. The launch platform system of claim 1, wherein the locking pin hole of the flange is aligned with a pin-receiving channel formed through the first component, and wherein the locking pin extends into the locking pin hole and the pin-receiving channel when the locking pin is in the deployed position.

14. The method for selectively adjusting a stiffness of a coupling interface between a first component and a second component in a launch platform system, the method comprising:

securing at least one support coupler of an interface assembly to the first component, wherein the at least one support coupler comprises a main body, a first arm extending from a first side of the main body, a second arm extending from a second side of the main body, and a flange extending from the main body, wherein the flange includes a locking pin hole that is configured to selectively receive the locking pin; and selectively moving the locking pin between a retracted position in which the locking pin is out of the locking pin hole, and a deployed position in which the locking pin extends into the locking pin hole and a portion of the first component and locks the interface assembly to the first component.

15. The method of claim 14, further comprising securing the at least one support coupler to a portion of the second component.

16. The method of claim 14, wherein the coupling interface has a first stiffness when the locking pin is in the retracted position, and a second stiffness when the locking pin is in the deployed position, and wherein the second stiffness exceeds the first stiffness.

17. The method of claim 14, further comprising operatively coupling an actuator to the locking pin, wherein the selectively moving comprises operating the actuator to selectively move the locking pin between the retracted position and the deployed position.

18. The method of claim 14, wherein the securing comprises:

retaining a central coupling pin within a coupling aperture of the main body;

retaining a first end fastener within a first through-hole at a first distal end of the first arm; and retaining a second end fastener within a second through-hole at a second distal end of the second arm.

19. The method of claim 18, wherein the coupling aperture, the first through-hole, and the second through-hole are aligned along a longitudinal axis, and wherein the locking pin hole and the coupling aperture are aligned along a lateral axis that is orthogonal to the longitudinal axis.

20. A launch platform system comprising:

a frame including a ledge having a lug-passage channel formed therethrough;

a thrust beam that moveably couples an engine to the frame, wherein the thrust beam has a lug at an end that extends through the lug-passage channel;

an actuator operatively coupled to a locking pin, wherein the actuator is configured to selectively move the locking pin between a retracted position and a deployed position; and an interface assembly that is configured to selectively adjust a stiffness of a coupling interface between the frame and the thrust beam, the interface assembly comprising:

at least one support coupler secured to the frame and the lug at the end of the thrust beam, wherein the at least one support coupler comprises a main body, a first arm extending from a first side of the main body, a second arm extending from a second side of the main body, and a flange extending from the main body, wherein the main body comprises a coupling aperture that retains a central coupling pin that securely couples the at least one support coupler to the frame, wherein the first arm comprises a first through-hole at a first distal end, and the second arm comprises a second through-hole at a second distal end, wherein the first through-hole retains a first end fastener that couples the at least one support coupler to the frame, wherein the second through-hole retains a second end fastener that couples the at least one support coupler to the frame, wherein the coupling aperture, the first through-hole, and the second through-hole are aligned along a longitudinal axis, wherein the flange includes a locking pin hole that is configured to selectively receive the locking pin, wherein the locking pin hole and the coupling aperture are aligned along a lateral axis that is orthogonal to the longitudinal axis, wherein the locking pin hole of the flange is aligned with a pin-receiving channel formed through the frame, and wherein the locking pin extends into the locking pin hole and the pin-receiving channel when the locking pin is in the deployed position, wherein the locking pin is selectively moveable between the retracted position in which the locking pin is out of the locking pin hole, and the deployed position in which the locking pin extends into the locking pin hole and a portion of the frame and locks the interface assembly to the frame, and wherein the coupling interface has a first stiffness when the locking pin is in the retracted position, and a second stiffness when the locking pin is in the deployed position, and wherein the second stiffness exceeds the first stiffness.

21. An interface assembly providing selective adjustment of stiffness, comprising:

a frame;

a beam having a lug with a coupling hole;

a support coupler having first and second distal ends secured via fasteners to the frame, and a main body with a coupling aperture coupled via a securing pin to the coupling hole in the beam lug, the support coupler including a flange extending upward from the main body and having a locking pin hole in which a locking pin is selectively inserted to secure the flange to the frame, wherein when the locking pin is removed from the locking pin hole the support coupler has a nominal stiffness that mitigates interface loads between the beam and frame, and when the locking pin is inserted in the locking pin hole to secure the flange to the frame the support coupler selectively provides an increased stiffness exceeding the nominal stiffness.

22. The interface assembly of claim 21, where the support coupler has a first arm extending from the main body to the first distal end, and a second arm extending from the main body to the second distal end, and the lengths of the first arm and second arm are at least longer than the length of the flange.

23. The interface assembly of claim 22, wherein the length of the first arm and second arm have a length that is determined based on a predetermined rate of deflection of the support coupler in respond to predetermined interface loads between the beam and the support coupler, such that the interface loads between the beam and frame are minimized.

* * * * *